(12) United States Patent  
Bourbeau et al.

(10) Patent No.: US 8,275,918 B2  
(45) Date of Patent: Sep. 25, 2012

(54) ENVIRONMENTAL CONDITION MONITOR FOR ALTERNATIVE COMMUNICATION PROTOCOLS

(75) Inventors: Kevin M. Bourbeau, Pepperell, MA (US); Anthony T. Batista, Ashby, MA (US); Eric C. Beishline, Marlborough, MA (US); Been-Chyuan Lin, Boxborough, MA (US); Tiago Braz Anes, Framingham, MA (US)

(73) Assignee: Setra Systems, Inc., Boxborough, MA (US)

( * ) Notice: Subject to any disclaimer, the term of this patent is extended or adjusted under 35 U.S.C. 154(b) by 59 days.

(21) Appl. No.: 12/752,379

(22) Filed: Apr. 1, 2010

(65) Prior Publication Data

US 2010/0256788 A1 Oct. 7, 2010

Related U.S. Application Data

(60) Provisional application No. 61/165,613, filed on Apr. 1, 2009.

(51) Int. Cl.
 *G06F 13/12* (2006.01)
 *G06F 13/38* (2006.01)
(52) U.S. Cl. .......................... 710/62; 710/69
(58) Field of Classification Search .............. 710/62
 See application file for complete search history.

(56) References Cited

U.S. PATENT DOCUMENTS

| | | | | |
|---|---|---|---|---|
| 5,495,769 A | * | 3/1996 | Broden et al. | 73/718 |
| 6,496,019 B1 | * | 12/2002 | Briefer | 324/652 |
| 6,708,239 B1 | * | 3/2004 | Ellerbrock et al. | 710/62 |
| 7,047,338 B1 | | 5/2006 | Nguyen | |
| 7,277,970 B2 | * | 10/2007 | Ellerbrock et al. | 710/62 |
| 7,376,760 B1 | * | 5/2008 | Ivchenko et al. | 710/8 |
| 7,523,241 B2 | | 4/2009 | Konishi | |
| 2004/0268160 A1 | * | 12/2004 | Atkinson et al. | 713/300 |
| 2005/0235088 A1 | * | 10/2005 | Kang | 710/305 |
| 2006/0234621 A1 | * | 10/2006 | Desrochers et al. | 454/239 |
| 2008/0027730 A1 | * | 1/2008 | Novack et al. | 704/275 |

* cited by examiner

Primary Examiner — Chun-Kuan Lee
Assistant Examiner — Ronald Modo
(74) Attorney, Agent, or Firm — John L. DeAngelis; Beusse Wolter Sanks Mora & Maire, P.A.

(57) ABSTRACT

An environmental condition monitor (200) configured for simple upgrade from analog signal output to any of a plurality of digital communication protocols. A display board (202) includes the analog signal acquisition and processing elements of the device and also includes a pre-positioned but initially inoperative digital communication output connector (214). A connector board (204) associated with the display board includes a connector (212) to which any one of a plurality of digital communication boards (210) may be selectively connected, depending upon which of a plurality of digital communication protocols is desired. Selective connection of a digital communication board completes a circuit whereby an analog output signal is converted to the desired digital output format and is then communicated back to the now-activated digital communication output connector (214).

17 Claims, 5 Drawing Sheets

ENVIRONMENTAL CONDITION MONITOR FOR ALTERNATIVE COMMUNICATION PROTOCOLS

CROSS-REFERENCE TO RELATED APPLICATIONS

This application claims the benefit of prior U.S. Provisional Application No. 61/165,613 filed 1 Apr. 2009, the content of which is hereby incorporated by reference.

FIELD OF THE INVENTION

This invention relates generally to environmental parameter monitoring instruments, and more particularly to a room pressure monitoring device.

BACKGROUND OF THE INVENTION

Environmental parameter measuring systems are well-known in the art for use with temperature control, security control, room pressure monitoring and a variety of other applications that allow a user to monitor and/or control an environment, either directly or remotely. Such systems may be physically supported in numerous ways on a horizontal surface such as a desk, table, floor or ceiling, or on a vertical surface such as a cubicle, wall, or the like.

Room pressure monitors are known instruments used to monitor air pressure in a controllable environment. Applications for room pressure monitors include infectious disease isolation rooms in hospitals, animal resource facilities, clean rooms, pharmaceutical manufacturing, asbestos abatement projects or other hazardous areas. Typically, air pressure in a controllable environment is maintained at a different pressure than an adjacent area in order to direct air flow and to prevent or to reduce the risk of cross-contamination. In the instance where a controllable environment contains toxins, for example, the controllable area should be kept under negative pressure relative to an adjacent clean area so that any air leakage will be in the direction of clean air leaking into the contaminated environment.

In order for a pressure monitor to work effectively, it must be properly installed, calibrated, serviced, and maintained. This is important because the differential pressures being monitored may be small but the consequences associated with instrument failure or inaccuracy could be significant.

Currently available room pressure monitors attach to a surface, such as a wall panel, and typically are shipped or sold as an assembled device, i.e., with the instrument operating components attached to a special outermost fitting or enclosure customized for the specific instrument. The fitting is mounted to a support beam or stud of the wall where it is then wired and connected to airflow tubing. Paneling, such as gypsum, is then used to finish the wall and conceal exposed wiring and tubing. The fitting is located behind the paneling but is sufficiently exposed to re-install the instrument operating components of the device. If the fitting is not installed precisely, the operating components may be difficult to install and/or the instrument may not fit flush to the wall surface and may not provide an air tight seal there between. It is also possible that the instrument operating components are lost or damaged during the disassembly/reassembly process. When these units require repair or calibration, the work involved typically requires at least partial disassembly and/or complete removal.

Current instruments are typically configured for either analog or digital communication. Analog instruments are sometimes discarded prior to the end of their useful life because the user decides to upgrade to a digital communication system.

Surface mounting of instruments are desired in many applications because they make use of otherwise unused space within a wall, and because the instrument is largely protected from impact damage by the surrounding wall. Also, the vertical face of a wall-mounted surface instrument tends to collect little dust or debris, and it may be relatively easy to clean and to disinfect compared to a horizontal surface of a free-standing instrument. However, there is an ongoing need for surface mounted instruments that provides simplified installation, servicing and upgrading.

BRIEF DESCRIPTION OF THE DRAWINGS

An embodiment of the invention is explained in the following description and in view of the drawings that show.

DETAILED DESCRIPTION OF THE INVENTION

Figure 1:
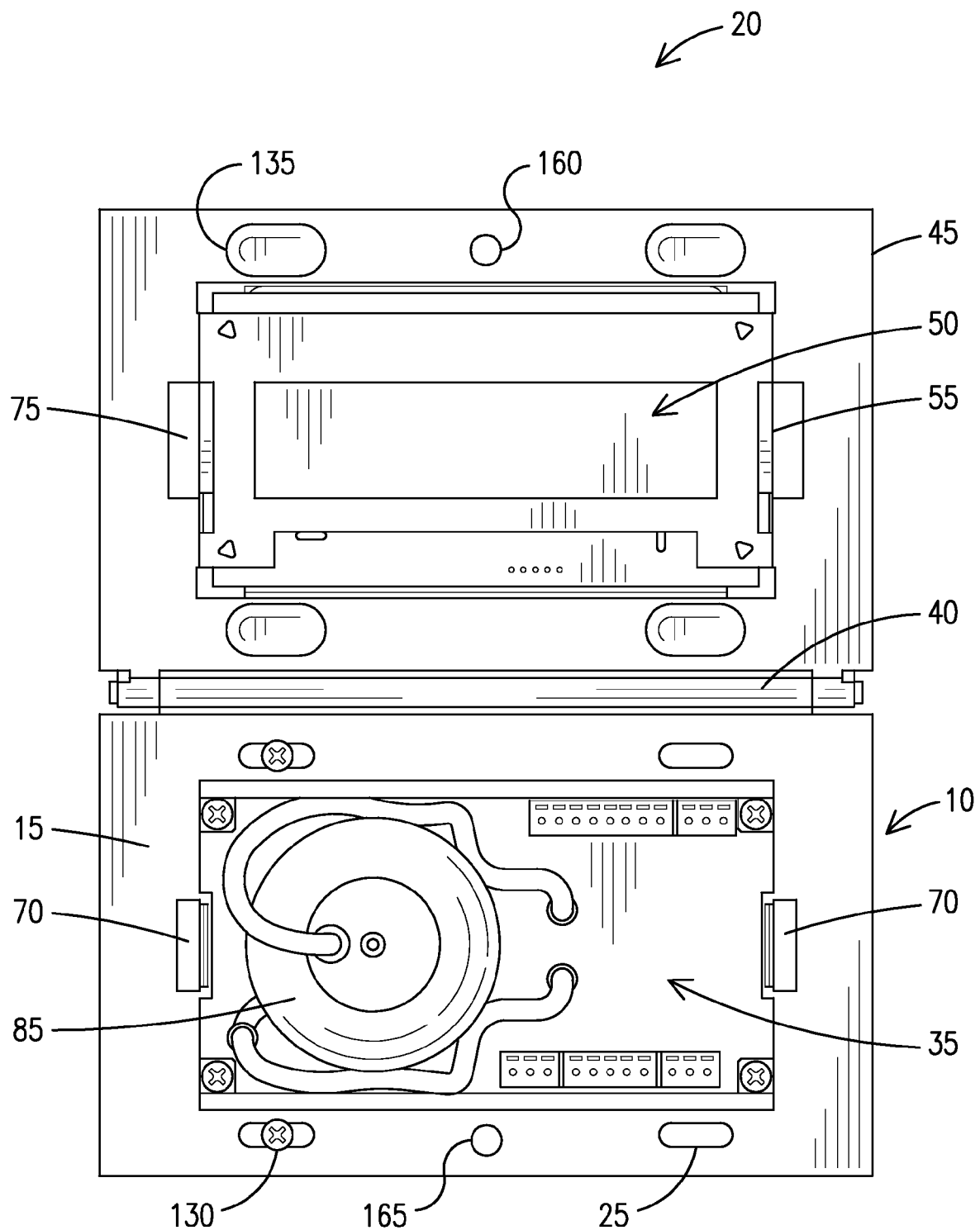
FIG. 1 is a front view of an embodiment of the housing of a room pressure monitor showing a display module rotated to an uppermost or servicing position.

An embodiment of the invention is illustrated and described herein. FIG. 1 is a front view of an embodiment of housing 10 of a room pressure monitor 20 in a servicing position. Housing 10 may be a polycarbonate, plastic, or other known material. Housing 10 has an internal volume 35 shaped and sized to receive components 85 and has a front mounting flange (or collar) 15 used for positioning the housing 10 in a desired plane when mounted.

Attached by hinge 40 along a top portion of housing 10 is a display module 45 that supports an active electronic display 50. The term "display" is used herein to refer to an active electrical component that responds to an electronic signal and provides a visual or other humanly perceptible output, and it may include printed circuit board elements, thin film transistors (TFT), a liquid crystal display (LCD) or other desired type of input/output that may be interactive and communicate with components 85 either wirelessly or by a flex cable (not shown). The term "display module" is used herein to refer to the mechanical support structure to which the "display" is mounted. Display 50 can attach to display module 45 by screws, spring clips or other such fasteners 55 such that display 50 can be replaced in the field by simply removing fasteners 55 and unplugging a flex cable, for example. If the display includes a circuit board separate from an output screen, each of these may be secured to the display module separately or the screen may be secured to the board with the board being secured to the display module, and each may be replaced separately as needed. Because display 50 and display module 45 are independent of housing 10, an advantage of an embodiment of the present invention is that a display 50 larger than housing 10 may be used. This overcomes a problem of prior art devices where all of the instrument constituents had to fit within the specialized fitting (housing), thus mandating the use of relatively large specialized enclosures and/or undersized displays.

Figure 2:
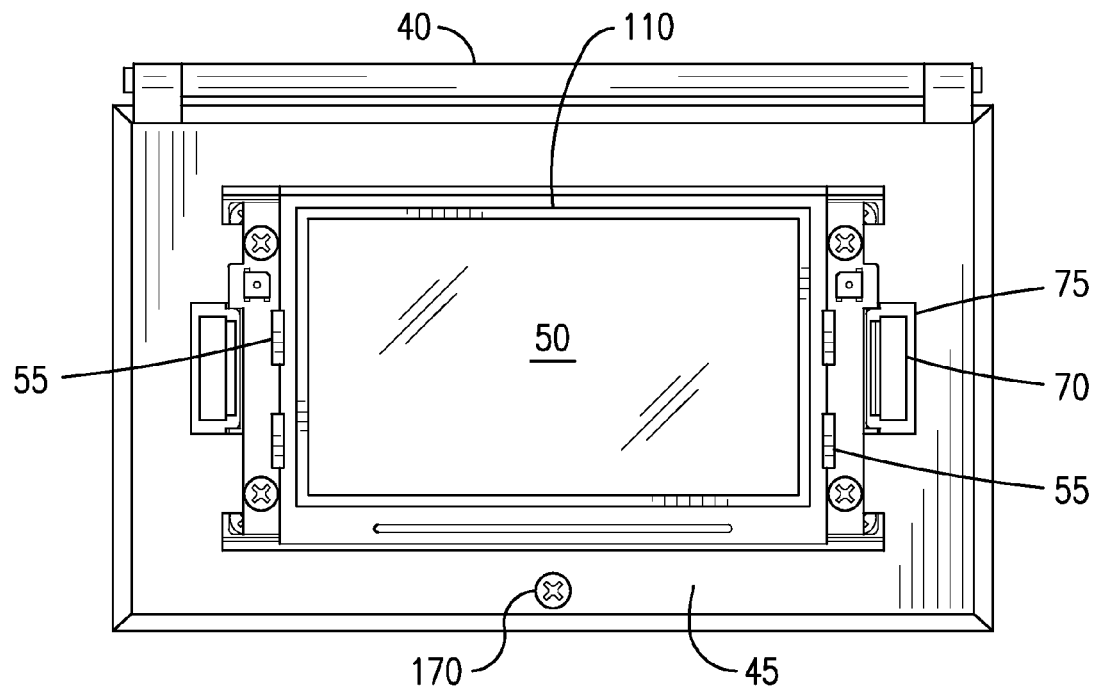
FIG. 2 is an embodiment of the room pressure monitor of FIG. 1 with display module rotated to a lowermost position, as during operation or shipping.
Figure 5:
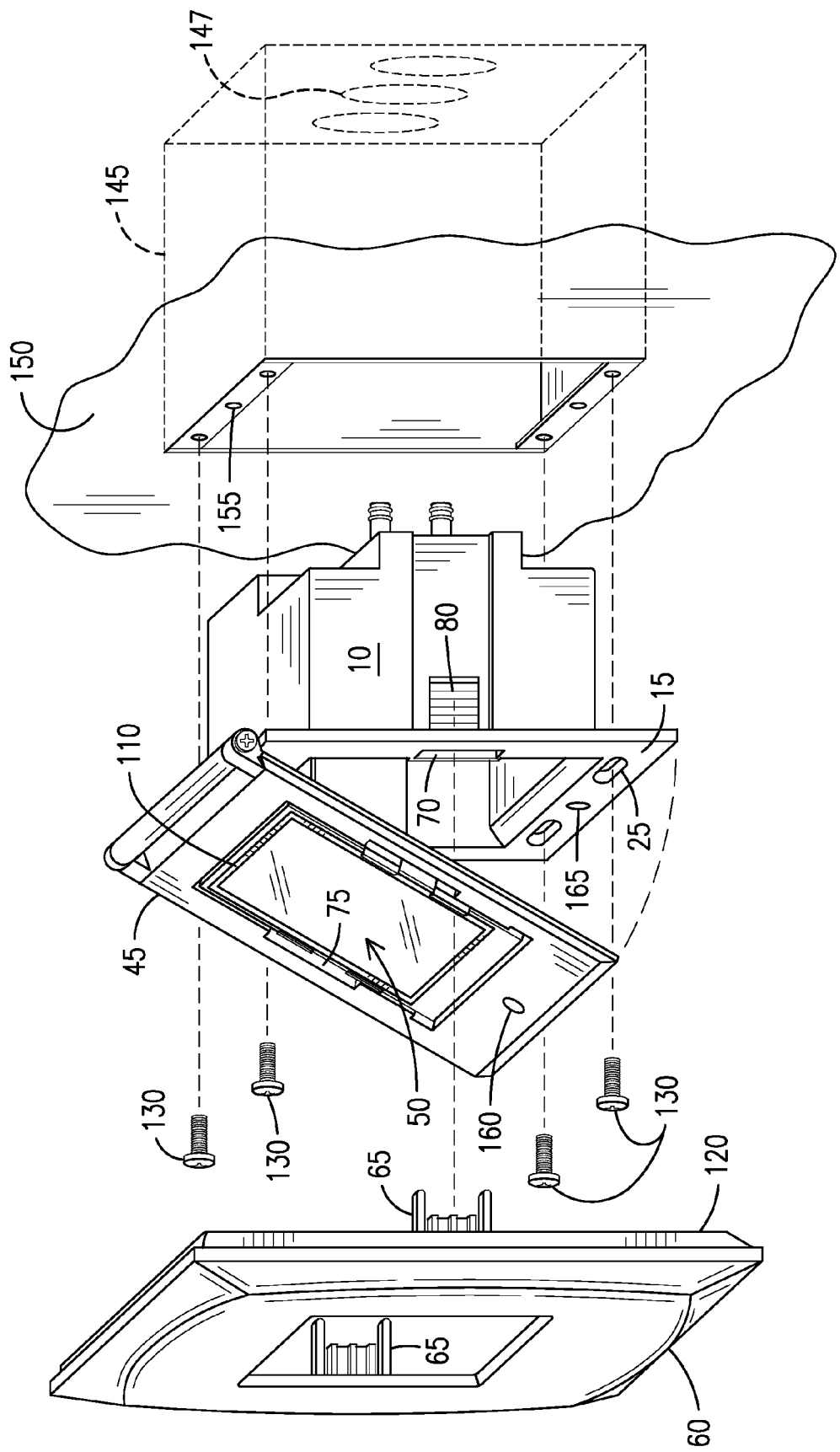
FIG. 5 is an exploded view of an embodiment of the invention showing an exemplary surface and fitting.

It is a further embodiment of the invention that display 50 remains functional while display module 45 is rotated about hinge 40, in order to permit use while accessing internal housing 35 for field calibration, firmware upgrades, etc. Accordingly, display module 45 can rotate approximately 180° from a lowermost operating position as shown in FIG. 2 to an uppermost maintenance position as shown in FIG. 1. An intermediary of these two positions is shown in FIG. 5. A mechanism may be used to selectively restrain movement of display module 45 and/or to hold it in a selected position, for instance when accessing operating components 85. Such mechanisms may include a detent, ratchet, pin, friction joint, pressure cylinder or any other known mechanism for selectively restraining motion. In other embodiments display module 45 may be hinged on other locations of housing 10 or attached by a slide or swivel in order to provide access. Additionally, hinge 40 can be coupled to a slide, swivel, or combinations thereof.

Mounting flange (or collar) 15 can be secured to practically any surface by glue, solder, nails, screws or the like, or it may be secured to a standard electrical rough-in box (as shown in see FIG. 5). Collar 15 may have oversized openings 25 formed there through to accept screws 130 and provide a high degree of adjustment for positioning housing 10 relative to an affixing structure. As shown in FIG. 1, depressions 135 may be formed on the backside of module 45 that correspond to locations of the screws 130 so that when module 45 is in a lowermost shipping or operating position, heads of screws 130 do not interfere with module 45, hinge 40 or cover 60. Hole 165 corresponds to hole 160 and may be used to fixedly connect module 45 to housing 10 during shipping, handling or installation. FIG. 2 illustrates an embodiment of the invention when instrument 20 is assembled for shipping (or in optional operating mode). Screw 170 is shown connecting holes 160 and 165 thereby joining module 45 with housing 10 for keeping pressure monitoring instrument 20 safe during packaging, shipping and/or use.

Figure 3:
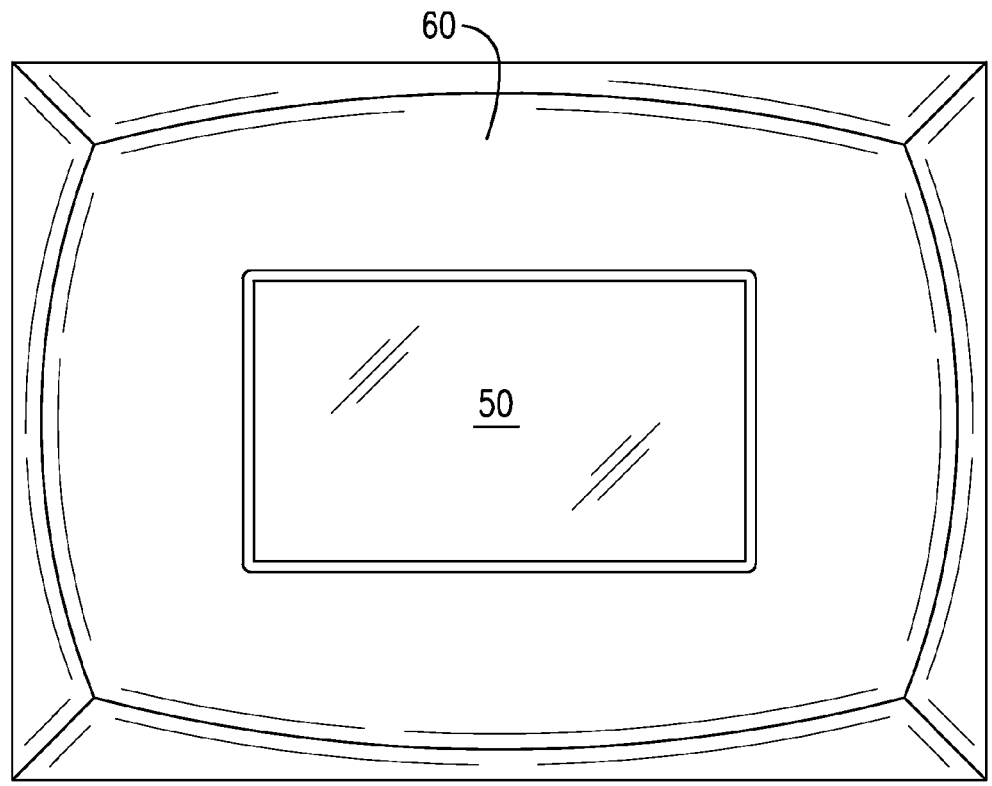
FIG. 3 is a front view of a cover plate installed over the room pressure monitor of FIGS. 1 and 2 in an operating position as seen by a user.
Figure 4:
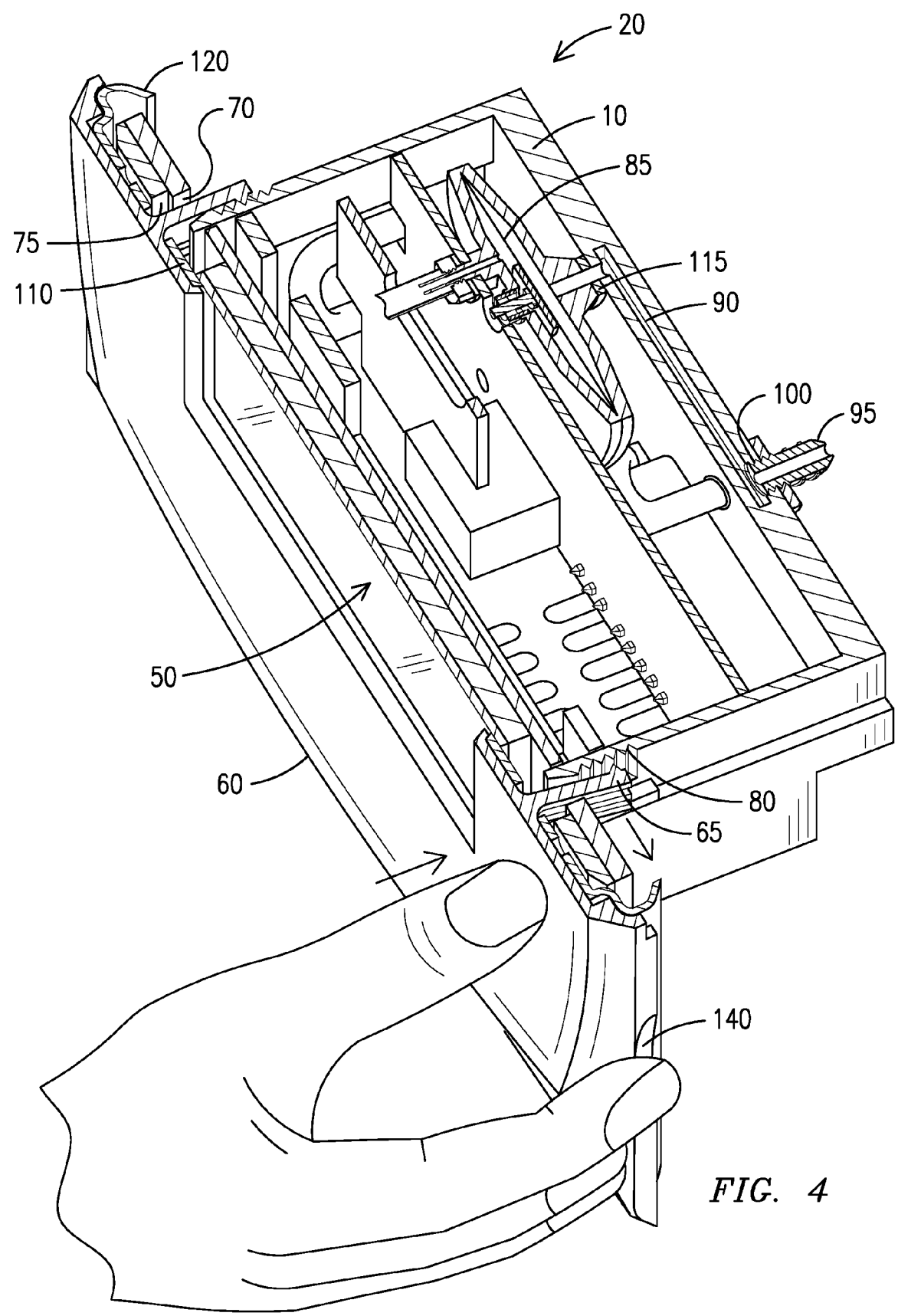
FIG. 4 is a partial perspective view of an embodiment of the room pressure monitor of FIG. 1 sectioned along a horizontal plane, showing operating components, subsurface channeling, and how the cover plate may engage and disengage with the housing.

FIG. 3 represents the appearance of monitor 20 to an end user when cover plate 60 is attached. As shown, cover plate 60 installs over housing 10 and/or display module 45 and furnishes a clean, flush mounting with no visible fasteners. Further, cover plate 60 protects against ingress/egress of gas, particles, or unwanted debris or other forms of contamination. Attachment of the cover is illustrated in FIG. 4, which is a partial perspective view of an embodiment of the invention sectioned along a horizontal plane showing pawl 65 engagement with housing 10. As shown, a cover plate 60 includes pawl 65 extending rearward from and generally perpendicular to a plane of the cover plate 60. A receiving opening 70 is formed on housing 10 that is shaped and positioned to receive pawl 65, such that movement of pawl 65 into opening 70 deflects pawl 65 causing it to snap into a flush or mated position. Prior to engaging with housing 10, pawl 65 may bypass display module 45 or pass through opening 75 formed in display module 45 in various embodiments. In the embodiment illustrated, two pawls 65 are formed on opposite sides of cover plate 60 and engage with a series of notches 80 formed in corresponding openings of housing 10. As shown, cover plate 60 may be attached to housing 10 with display module 45 in an operating position by inserting pawl(s) 65 through the corresponding opening(s) 75, 70 until pawl 65 engages the plurality of notches 80 in sequential order as the cover 60 is moved toward the housing 10. As cover plate 60 is further urged toward display module 45, pawl 65 will engage with the next notch in series 80. Ideally, the process continues until movement of the pawl 65 toward the housing 10 is restricted at an installed position when the first and second seals are seated and the cover plate 60 is secured against the instrument mounting surface (item 150 of FIG. 5) and cover plate 60 can be urged no closer to display module 45. There is a spring action from the pawl 65 which secures cover plate 60 in place without need for additional fasteners. Furthermore, the range of engagement of pawl 65 with series of notches 80 allows cover plate 60 to be held flush with a surface even if the installation of housing 10 and/or front mounting flange or collar 15 is not in a perfect plane parallel to mounting surface 150. In an embodiment illustrated by FIG. 4, a seal such as gasket 110 is interposed between cover plate 60 and display 50 (or optionally between the cover 60 and the display module 45, not shown) and another seal such as gasket 120 is interposed between cover plate 60 and a mounting surface 150 about a perimeter of the cover for protection against contamination ingress into the housing 10. Interposed gaskets 110, 120 ensure protection against dust and water spray ingress to a degree sufficient to achieve an ingress protection rating such as IP 54 even if there is some unevenness in the mounting surface 150. Acceptable gaskets may include 35 durometer closed cell foam or molded elastomeric materials as are typically used in sealing applications. Gasket 120 may further provide for correction of misalignment between housing collar 15 and mounting surface 150 by filling any space that may exist there between. Since the display 50 may also function as a touch screen input device, the cover plate 60 includes a window aligned with the display 50 when in its installed position to allow for tactile contact with the display. Typically the window is simply an opening, thus requiring gasket 110 to prevent the ingress of contaminants. However, one may appreciate that depending upon the functionality of the display 50, in certain embodiments the window may be a transparent material that is permanently attached to and sealed against the cover 60, thereby eliminating the need for gasket 110.

Cover plate 60 may be formed of plastic, sheet metal, or other relatively flexible material. Removal of plate 60 may be facilitated by a slight bending such that the pawl 65 is at least partially disengaged from the series of notches 80 and allows plate 60 to be removed from receiving opening 70 and/or display module opening 75. As shown in FIG. 4, a user could push against the front of plate 60 with a thumb at the location of the arrow in FIG. 4 to slightly bend cover plate 60 inward at that location, thereby rotating pawl 65 causing it to disengage and lift away from the series of notches 80. Grasping of cover plate 60 for removal may be facilitated by forming finger indentations 140 on the edge of the cover plate 60 or by slots formed for a tool such as a flat blade screwdriver. Even if pawl 65 is not lifted completely away from series of notches 80, any degree of disengagement of pawl 65 from the notches 80 would reduce the force necessary to pull cover plate 60 away from the surface 150.

Since calibration of monitor 20 and operating components thereof may involve access to internal volume 35, the present invention provides access to and optimal use of internal volume 35. An embodiment of the invention therefore includes using wall(s) of housing 10 to serve as additional or optional paths for communicating with operating components 85 or display 50. FIG. 4 illustrates an embodiment where a subsurface channel(s) 90 is formed within a wall of housing 10.

Subsurface channel 90 may be produced when fabricating housing 10 by known processes such as injection molding or by mechanical material removal such as drilling. As shown, subsurface channel 90 may be used as part of a flow path for delivery of measured room pressure to a sensor 85 or for additional wiring or other uses. In one embodiment, an input fluid connection 95 may be provided by forming a threaded hole 100 part-way through housing 10 from the rear portion. Threaded hole 100 could be in fluid communication with subsurface channel 90 and may be supplied with working fluid via input fluid connection 95. An outlet from subsurface channel 90, optionally surrounded by a gasketed seal 115, may further be formed to open into housing 10 and used for delivering working fluid to a pressure sensor 85. Because there is no flow requirement for such a pressure measuring working fluid, the size of subsurface channel 90 may be small. Working fluid may be delivered to any location about housing 10. Consequently, the use for internal tubing is greatly reduced if not eliminated within internal volume 35, thereby saving valuable interior space.

In order to eliminate the need of having a custom fitting or losing operating components during installation of the custom fitting, an embodiment of the invention includes housing 10 connected to a universal electrical box, such as typically provided during building construction rough-in. As shown in FIG. 5, housing 10 may mount to an opening of a surface 150 and connect to a rough-in box 145, such as a known double deep triple ganged box, by screws 130 that connect with screw receiving ports 155 on the box flange or by other means such as clips or ties. In this embodiment, the triple ganged box 145 provides anchoring support for instrument 20 as well as industry standard attachment points 147 for access to power, wiring and/or other components as necessary. Unlike prior art devices where a surface mounted instrument is mounted within a specialized fitting, the device of FIG. 5 can be installed into a readily available "off the shelf" roughed-in triple ganged box 145. This allows the installer to run all of the wiring and plumbing during the construction rough-in phase without having to purchase and store the room pressure monitor in advance of final installation. This saves the unit from being lost or damaged on site. Housing 10 is able to fit within a typical rough-in box 145 without restricting the size of display 50. Furthermore, the installation can be made flush to surface 150 with interior 35 sealed from the external environment in spite of some imprecision in the installation of rough-in box 145 due to the degrees of mounting freedom provided via screws 30, 130, oversized slots 25, and gaskets 110, 120.

A basic room pressure monitor may be designed for analog communication with other instruments and systems. In an analog installation, analog control signals are received from and sent to control hardware, and analog signals may operate a local display associated with the monitor. Some time after installation of an analog room pressure monitor, the user or building owner may elect to install a digital communication network within the building to permit monitoring and control of the multiple sensors and equipment such as air flow control valves in the building. Such digital communication networks are inherently more reliable and robust than analog communication systems. This modification necessitates upgrading the analog room pressure monitor to communicate over the digital network. Such an upgrade may require the replacement of the room pressure monitor instrument, or if the instrument is so configured, by field installation of a digital communication board in the analog room pressure monitor and connection of that board to the digital communication network.

Figure 6:
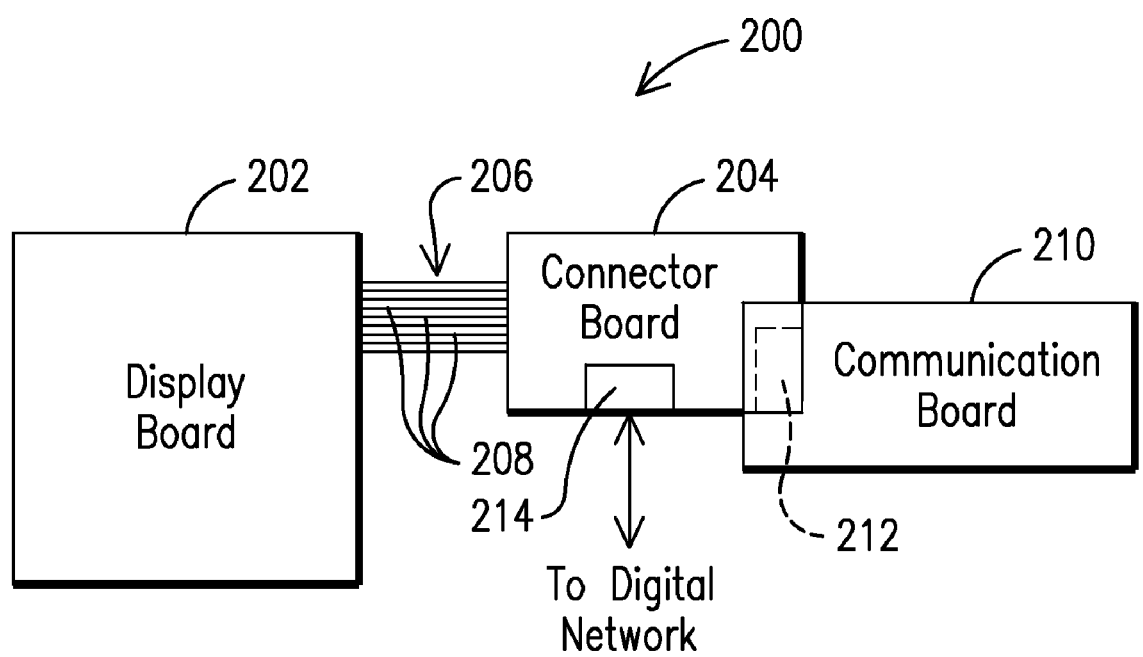
FIG. 6 is a block diagram of an embodiment of an environmental condition monitor allowing for interchangeable communication protocols.

FIG. 6 illustrates certain elements of a room pressure monitor 200 according to the present invention, including the capability to communicate with other building system components according to a digital communication protocol over a digital communication network. The room pressure monitor 200 includes an electrical component board such as display board 202 and a connector board 204 that are electrically connected by a ribbon conductor 206 comprising a plurality of conductors 208. The connector board 204 further connects to a digital communication board 210 through a pin/socket connector 212, comprising pins on the digital communication board 210 received within sockets on the connector board 204.

Although not illustrated in FIG. 6, the display board 202 includes analog and digital components for measuring and displaying the sensed room pressure and additional components ancillary thereto. In addition to providing electrical connectivity between the display board 202 and the digital communication board 210, the connector board 204 includes power supply components for supplying power to the various elements of the room pressure monitor 200.

The connector board 204 further includes a connector 214 for connection to elements of the digital communication network. Typically, the connector 214 comprises a three-pin connector: a first pin for carrying transmitted signals, a second pin for carrying received signals and a third ground pin. One skilled in the art will appreciate that conductors other than metal pins may be used to carry some or all of the signals described herein in certain embodiments, such as optical fiber signal conductors. In operation, pressure readings are supplied to the display board for processing and display. The pressure readings are also provided to the communication board 210 via the connector 212. On the communication board the pressure values are properly formatted to the operative digital communication protocol or format. The digital communication output signal is then supplied to the connector 214, via conductors of the connector 212, the connector board 204, the ribbon conductor 206 and the display board 202.

Although the digital signal output connector 214 is present in the analog portion of the room pressure monitor, i.e., on the connector board 204, digital data communication does not begin until a digital communication board is plugged into the connector 212 and the board activated. One such digital protocol is know as BACnet, a data communication protocol developed for building automation and control networks under the auspices of the American Society of Heating, Refrigeration and Air-Conditioning Engineers (ASHRAE). Another known digital protocol is the LonWorks® networking platform developed by the Echelon Corporation.

According to one embodiment of the present invention, the room pressure monitor 200 may be provided with basic analog communication circuitry, i.e., the display board 202 and the connector board 204. The connector board 204 enables simple field connection of either a BACnet or LonWorks® communication board 210 to the connector 212, i.e., a communication board operative according to the BACnet protocol or a communication board operative according to the LonWorks® protocol. While the number and function of individual conductors within the connector 212 for proper functioning of BACnet and LonWorks® boards may be different, the present invention allows for a combination of those functionalities into the single connector 212 in order to preserve real estate on the connector board 204. This may be accomplished in one embodiment by configuring the connector 212 with a sufficient number of pins such that while some pins perform the same function in both protocols, dissimilar functions can be accommodated on different pins so that some pins may remain unused by one protocol.

Furthermore, when a digital communication board 210 operative according to any selected protocol (e.g., BACnet and LonWorks®) is plugged into the connector 212, a processor on the display board 202 may interrogate the digital communication board 210 via the ribbon conductor 206 and the connector board 204. The processor recognizes that the communication board has been plugged into the connector and further determines the type of communication protocol operative on the communication board 210. According to one embodiment, this may be accomplished automatically by measuring an electrical parameter value on the digital communication board 210. The electrical parameter value may be determined from a component value such as a unique resistor value or by sensing a short circuit or a voltage value on the digital communication board 210. Different resistance values or voltages identify different digital communication protocols. According to another embodiment, this determination is accomplished with a user input that provides a protocol identifier via an I/O device. According to yet another embodiment, the processor determines the digital value (a high or a low voltage) on one or more pins of the connector 212. These digital values are determined by the protocol operative on the digital communication board 210.

After the processor on the display board determines the operative digital communication protocol, the processor enables certain features of the operative communication protocol. For instance, the processor ensures that a unique identification code is appended to all LonWorks® communication signals and enables functions of the room pressure monitor that the communication protocol can accommodate. Also, the display identifies the operative communication protocol under control of the processor on the display board.

This single connector dual protocol functionality can be implemented not only on the connector 212 but also on the connector 214 so that the end user can access any available communication protocol via a single output connector, such as the common RS485 connector, typically provided at the rear of the instrument. Furthermore, some or all input/output connectors may be color coded to facilitate rapid and error free field connection. This allows the user to add or change the protocol without the need to remove and rewire the room pressure monitor 200.

When the communication board is detected, the connector 212 is energized for activating and communicating with the digital communication board 210. The outputs from the display board 202, such as the room pressure reading, are supplied to the communication board 210 where the information is properly formatted according to the communication protocol associated with the communication board 210. The analog outputs from the monitor may remain active after the digital communication board 210 has been plugged into the connector 212.

The external digital communication network will receive the digital data output signal from the instrument 200 and may also communicate to the instrument via the digital communications board 210. For example, the network may interrogate the instrument 200 to determine the current value of pressure, temperature, relative humidity or other measured environmental parameter. The network may also read the measurement range of the instrument 200, its serial number, alarm setpoint range, etc. If an alarm occurs, the alarm will be transmitted onto the network. The network supervisor can also write to the instrument 200 to reconfigure the unit remotely or to silence an alarm remotely.

Although the invention has been described with reference to the BACnet and LonWorks® digital communication protocols, those skilled in the art recognize that the teachings of the invention can be applied to other digital communication protocols and to other communication formats and hardware, such as optical communication over optical fibers.

The features described herein simplify the installation and maintenance of surface mounting systems, such as room pressure monitors as sold by the assignee of the present invention. While various embodiments of the present invention have been shown and described herein, it will be obvious that such embodiments are provided by way of example only. For example, these features may be embodied in instruments other than room pressure monitors, such as a temperature sensor, a humidity sensor, security systems, or other systems. Numerous variations, changes and substitutions may be made without departing from the invention herein. Accordingly, it is intended that the invention be limited only by the spirit and scope of the appended claims.

The invention claimed is:

1. An environmental condition monitor comprising:
   an analog processing element for sensing an environmental condition and providing an analog output signal responsive to the environmental condition:
   a digital output element;
   a connector element receiving the analog output signal via a first signal conductor, wherein the digital output element and a second signal conductor are disposed on the connector element;
   a first digital communication element adapted for removable physical connection to the second signal conductor of the connector element, the first digital communication element comprising an analog-to-digital processing element receiving the analog output signal and producing a first digital output signal responsive to the analog output signal according to a first digital communication protocol, the first digital communication element providing the first digital output signal to the digital output element via the second signal conductor; and
   further comprising a second digital communication element adapted for removable physical connection to the second signal conductor of the connector element in place of the first digital communication element wherein only one of the first and second digital communication elements is connected to the second signal conductor at any time, the second digital communication element comprising an analog-to-digital processing element receiving the analog output signal and producing a second digital output signal responsive to the analog output signal according to a second digital communication protocol, the second digital communication element providing the second digital output signal to the digital output element via the second signal conductor.

2. The environmental condition monitor of claim 1, further comprising a unique identification element associated with each of the first and second digital communication elements, an alternative one of the identification elements being electrically connected to the connector element when the respective first or second digital communication element is selectively connected to the connector element, thereby enabling identification of the associated one of the first and second digital communication protocols by identification of the unique identification element.

3. The environmental condition monitor of claim 2, wherein the unique identification element comprises an electrical component of the respective first or second digital communication element, wherein the electrical component associated with the first digital communication element has a first component value and the electrical component associated with the second digital communication element has a second component value, the first component value different from the second component value.

4. The environmental condition monitor of claim 3, wherein the electrical component comprises a respective resistor, and wherein the first and the second component values comprise a respective first and a second resistance.

5. The environmental condition monitor of claim 2, wherein the unique identification element comprises a unique voltage associated with each of the first and second digital communication elements.

6. The environmental condition monitor of claim 2, wherein the unique identification element comprises a unique user selectable value associated with each of the first and second digital communication elements.

7. The environmental condition monitor of claim 1, wherein the first digital communication protocol comprises a BACnet communication protocol and the second digital communication protocol comprises a LonWorks® communication protocol.

8. The environmental condition monitor of claim 1, wherein a function of the environmental condition monitor is enabled responsive to selective connection of a respective one of the first and second digital communication elements.

9. The environmental condition monitor of claim 1, wherein the analog processing element comprises a room pressure sensor, a temperature sensor, or a humidity sensor.

10. An environmental condition monitor comprising:
an electrical component board adapted for alternative electrical connection to any selected one of a plurality of digital communication boards, only one of the plurality of digital communication boards connected to the electrical component board at any one time, each digital communication board operative according to a respective different digital communication protocol;
any one of the digital communication boards connectable to the electrical component board via a same connector on the electrical component board; and
the electrical component board supplying an analog signal representative of a monitored environmental condition to the selected digital communication board via the same connector and the selected digital communication board supplying a digital data signal responsive to the analog signal and according to the selected digital communication protocol to a digital data output element via the same connector.

11. The environmental condition monitor of claim 10, further comprising:
an analog output element receiving an analog output signal regardless of whether or not any digital communication board is connected to the electrical component board; and
the digital data output element receiving the digital data signal only when one of the plurality of available digital communication boards is connected to the electrical component board.

12. The environmental condition monitor of claim 10 wherein the analog signal is responsive to a room pressure parameter, a temperature parameter, or a humidity parameter.

13. The environmental condition monitor of claim 10, further comprising a unique identification element associated with each of the plurality of digital communication boards to enable automatic identification of the digital communication protocol associated with the selected digital communication board.

14. The environmental condition monitor of claim 10 wherein the plurality of digital communication boards comprises a digital communication board operating according to a BACnet communication protocol and a digital communication board operating according to a LonWorks® communication protocol.

15. An environmental condition monitor including analog sensing and signal processing elements producing an analog signal output responsive to a sensed environmental parameter, the environmental condition monitor further comprising:
a digital output connector that is inoperative when the environmental condition monitor is operated in an analog only mode; and
a plurality of interchangeable digital communication elements each configured to selectively operatively engage a connector of the environmental condition monitor, the engagement of a selected one of the digital communication elements effective to activate the digital output connector to provide a digital signal output responsive to the sensed environmental parameter, the digital signal output having a selected digital communication protocol associated with the selected one of the digital communication elements only one of the plurality of interchangeable digital communication elements operatively engaging the connector at any time.

16. The environmental condition monitor of claim 15, further comprising a first set of pins of the connector being operative when a first of the digital communication elements is selectively engaged with the connector, and a second set of pins of the connector different than the first set of pins being operative when a second of the digital communication elements is selectively engaged with the connector.

17. The environmental condition monitor of claim 15, further comprising a respective unique identification element associated with each digital communication element, and circuitry of the environmental condition monitor operative to interface with the respective identification element to identify which of the plurality of interchangeable digital communication elements has been selectively operatively engaged with the connector of the environmental condition monitor.

* * * * *